United States Patent

Day et al.

Patent Number: 5,319,068
Date of Patent: Jun. 7, 1994

[54] NITRAMINE-CONTAINING POLYETHER POLYMERS AND A PROCESS FOR THE PREPARATION THEREOF

[75] Inventors: Roger W. Day, Southbury; Rahim Hani, Cheshire, both of Conn.

[73] Assignee: Olin Corporation, Cheshire, Conn.

[21] Appl. No.: 829,671

[22] Filed: Feb. 3, 1992

Related U.S. Application Data

[63] Continuation-in-part of Ser. No. 351,626, May 15, 1989.

[51] Int. Cl.$^5$ .............................. C08G 73/00
[52] U.S. Cl. .................... 528/422; 528/408
[58] Field of Search ................ 528/422, 408

[56] References Cited

U.S. PATENT DOCUMENTS

| | | | |
|---|---|---|---|
| 3,472,889 | 10/1969 | Frankel . | |
| 3,480,490 | 11/1969 | Finger et al. | 149/92 |
| 3,808,276 | 4/1974 | Comfort et al. | 528/422 X |
| 3,974,121 | 8/1976 | Wang | 528/422 X |
| 4,054,523 | 10/1977 | Ingenito et al. . | |
| 4,157,965 | 6/1979 | Raible . | |
| 4,164,468 | 8/1979 | Raible . | |
| 4,217,429 | 8/1980 | Wagner et al. | 528/422 X |
| 4,243,531 | 1/1981 | Crockett et al. . | |
| 4,250,294 | 2/1981 | Hagel et al. | 528/422 X |
| 4,457,791 | 7/1984 | Gill et al. | 149/19.3 |
| 4,664,682 | 5/1987 | Monzen . | |
| 4,690,762 | 9/1987 | Katsura . | |
| 4,737,139 | 4/1988 | Zupkas et al. . | |
| 4,758,337 | 7/1988 | Kohn et al. . | |
| 4,916,206 | 4/1990 | Day et al. | 528/272 |

OTHER PUBLICATIONS

"Research in Nitropolymers and their Application to Solid Smokeless Propellant Aerojet General" Report No. 1162, Sep. 28, 1956, pp. 49, 64, 186–191.
"High Performance Minimum Smoke Propellants", Technical Report CR-RD-PR-86-4, Hercules Incorporated, May, 1986, pp. 1–35.

*Primary Examiner*—John Kight, III
*Assistant Examiner*—Shelley A. Dodson
*Attorney, Agent, or Firm*—Dale L. Carlson

[57] ABSTRACT

Energetic binders, and, more specifically, a class of nitramine-containing polyether polymers characterized by favorable viscosity and glass transition temperature, as well as resistance to hydrolysis are prepared.

7 Claims, No Drawings

NITRAMINE-CONTAINING POLYETHER POLYMERS AND A PROCESS FOR THE PREPARATION THEREOF

This application is a continuation-in-part of U.S. Ser. No. 07/351,626 filed on May 15, 1989, now pending.

Field of the Invention

This invention relates generally to energetic binders, and, more specifically, to a class of nitramine-containing polyether polymers characterized by favorable viscosity and glass transition temperature, as well as resistance to hydrolysis.

Background of the Invention

Certain energetic binders which are useful in propellants and explosives formulations are known in the art. By way of illustration, a compound called GAP (glycidyl azide polymer) is known to provide energy and function as a binder when formulated in propellants and explosives used in various applications. However, materials such as GAP are very expensive, costing up to $100 per pound and are known to release gases during storage and/or prior to or during processing. In addition, toxic and explosive ingredients are required to produce this polymer. Therefore, alternate high energy binders that are less expensive and safer to produce and still afford a good combination of desirable characteristics, such as a high impetus, a low glass transition temperature, and a low viscosity, would be highly desired by the propellant and explosives community.

Various nitropolymers have been fabricated in the past for application in solid, smokeless propellants. For example, Aerojet General published a report, Report No. 1162, dated Sep. 28, 1956, entitled "Research in Nitropolymers and Their Application to Solid Smokeless Propellants". This report documents various polymerization reactions useful in making nitropolymers, including various esters of nitramino diacids. These polymers, however, generally have a higher molecular weight than might be desired and do not possess carefully controlled, reactive, functional end groups as would be desirable.

Hercules Incorporated investigated a specific nitramine-containing polymer, poly(diethylene glycol-4,7-nitrazadecanedioate) designated as P-DEND. In a report entitled "High Performance Minimum Smoke Propellants", Technical Report CR-RD-PR-86-4, dated May, 1986. Hercules documents work performed for the U.S. Army Missile Command wherein P-DEND is described as being a feasible ingredient for use in nitrate ester-plasticide propellants. This report states that attempts to fabricate P-DEND by an acid catalyzed esterification reaction of 4,7-dinitrazadecanedioic acid (DNDA) with diethylene glycol in a variety of organic solvents were unsuccessful. This failure is attributed in the report to the fact that a cyclization reaction rather than a polymerization reaction occurred. More recently, the present inventors have found that P-DEND has a viscosity and a glass transition temperature that are higher than might be desired.

U.S. Pat. No. 4,916,206 discloses a class of nitramine-containing, polyester polymers characterized by an advantageous combination of a relatively low viscosity and a low glass transition temperature. However, such polyester polymers are more subject to hydrolysis than might be desired.

U.S. Pat. No. 3,808,276 discloses alpha-hydro-w-hydroxy poly(oxymethylenenitramine) designated as EDNAP, produced by a process of reacting 1,6-dichloro-2,5-dinitrazahexane (DCDNH) with ethylene glycol in the presence of glycerol. Unfortunately, the presence of the glycerol, a triol, causes undesireable cross-linking of the EDNAP product in the production of this polyether, and the resulting polyether has a higher glass transition temperature ($T_g$) and viscosity than might be desired. Further, EDNAP produced without glycerol has now been found by the present inventors to have a weight average molecular weight that is lower than might be desired, as discussed more fully in the working examples given hereinbelow. Accordingly, new processes for producing EDNAP and other polyethers useful as energetic binders would be desired by the propellants and explosives community.

In addition, new polymer binders exhibiting excellent impetus and characterized by an advantageous viscosity and glass transition temperature, as well as a resistance to hydrolysis, and new processes for the production of these polymer binders would also be highly desireable.

SUMMARY OF THE INVENTION

In one aspect, the present invention relates to a nitramine-containing polyether polymer characterized by having a weight average molecular weight of between 2,000 and 4,000 which is produced by reacting a diol selected from the group consisting of 1,3-propylene glycol, diethylene glycol, and combinations thereof, with a nitramine-containing bischloromethyl monomer. The preferred bischloromethyl monomer is 1,6-dichloro-2,5-dinitrazahexane ("DCDNH").

In another aspect, the present invention relates to a nitramine-containing polyether polymer characterized by an advantageous combination of a high impetus, a low viscosity and a low glass transition temperature, as well as a resistance to hydrolysis. The novel polymers are characterized by having a weight average molecular weight of between 2,000 and 4,000 and having the following empirical structural formula:

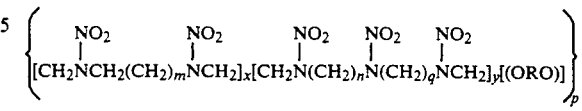

wherein m has a value between 0 and 6, preferably between 1 and 4, n and q have a value between 1 and 6, preferably between 0 and 3, and x represents a mole fraction having a value between 0 and 1, Y represents a mole fraction equal to 1 minus x and having a value between 0 and 1, R is a linear or branched chain alkylene or alkylene ether radical having between 3 and 12 (preferably between 3 and 6) carbon atoms and having primary or secondary carbon atoms at said radical's points of attachment in said polymer, and p has a value between 2 and 50 (preferably between 2 and 20), with the proviso that when m is equal to 0 and x is equal to 1, then Y has a value of greater than zero.

In another aspect, the present invention relates to a process for producing a nitramine-containing polymer which comprises the step of reacting a reaction mixture consisting essentially of a nitramine-containing bischlormethyl monomer and a diol monomer by a solvent-free, melt polymerization reaction to form said nitramine-containing polymer while removing by-product hydrogen chloride during the course of said reaction.

DETAILED DESCRIPTION OF THE INVENTION

The process of the present invention is conducted using a solvent-free, melt polymerization reaction consisting essentially of a reaction mixture which is triol-free (e.g., free of triols such as glycerol) in order to avoid uncontrolled crosslinking in the formation of the nitramine-containing polymer.

After the reaction in accordance with the process of the present invention has begun and particularly during the later stage of the reaction, it is preferred that hydrogen chloride be removed by vacuum as the reaction progresses in order to expedite formation of the desired nitramine-containing polymer product. Another possibility for the removal of the by-product hydrogen chloride is the addition of an acid acceptor which is non-reactive with the bischloromethyl monomer in the reaction mixture. In addition, it is preferred that the polymer product be purified in a purification step, suitably by precipitation in a solvent/non-solvent mixture or by using gel permeation chromatography. If desired, the nitramine-containing polymer is end-capped with a functional moiety to impart a desired terminal functionality to the polymer. In the absence of such end-capping, the polymer is generally chloro- or hydroxyl-terminated.

The polymers described in this invention are of the class described by the general empirical formula given above. The polymers are prepared by reacting a nitramine-containing (i.e. nitraza-containing) bischloromethyl monomer with a diol under melt polymerization reaction conditions (i.e. in the absence of a solvent).

The monomers useful in the present invention include the following bischloromethyl derivatives: 2,5-dinitraza-1,6-dichlorohexane; 2,5,8-trinitraza-1,9-dichlorononane; 2,4,6-trinitraza-1, 7-dichloroheptane, and 2,6-dinitraza-1,7-dichloroheptane and other bischloromethyl derivatives of similar structure. Useful diol monomers include a wide variety of diols, such as, for example, propylene glycol, 1,4-butane diol, 1,6-hexane diol, diethylene glycol and various other diols of similar structure.

The homopolymer identified in Table I below as Polymer 1 is preferred due to its relatively low glass transition temperature which provides superior processability into formulated products, such as propellants or explosives. In addition, this polymer was found to have relatively low viscosity which gives superior performance during processing of the formulated propellant or explosive product. Other preferred polymers are those identified as Polymers 3, 4, 5, and 6 in Table I below. These homo- and co-polymers also possess relatively low viscosity and glass transition temperatures.

It has been found, by virtue of the synthesis and characterization of various polymer structures leading up to the present invention, that certain polymer structures provide products having lower glass transition temperatures and lower viscosities than those provided by prior art polymers. Moreover, Polymer 1 has a lower $T_g$'s and lower viscosity than the other homopolymer materials fabricated. It is believed that these results are due to certain structural characteristics of the polymer molecule. Polymer 4 has one methylene group between the nearest neighboring nitraza groups and exhibits a higher glass transition temperature and a higher viscosity than Polymer 1. Although not wishing to be bound by any particular theory, the present inventors speculate that this result is due to a steric hinderance or polar interaction between the nitraza groups which inhibits rotation within the molecule about the molecular axis. Such interaction leads to higher glass transition temperatures and viscosities.

The present inventors theorize that the larger spacing between the sterically bulky and polarized nitraza groups, such as the two methylene groups in Polymer 1, provides a resulting polymer having a lower glass transition temperature and lower viscosity. The glass transition temperature of Polymer 1 is much lower than that for the other polymers.

Although exact viscosity measurements for these polymers have not been made due to sample size limitations, empirical measurements indicate Polymer 1 is less viscous than Polymer 4. This may due in part to the molecular weight differences between the two polymers, but even when a variety of higher molecular weight (as indicated by GPC) samples of Polymer 1 were prepared, the viscosity was found to be significantly lower than that of Polymer 4. The glass transition temperature for Polymer 1 was measured to be $-18°$ C. The other polymers identified in Table I are solids at room temperature, and thus are expected to have glass transition temperatures above that of Polymer 1 ($-18°$ C.).

The polymers and co-polymers of the present invention combine the advantages cited above with high calculated (by the Naval Weapons Center PEP method) impetus in propellant formulations, a desired functionality of very near two, primarily hydroxyl termination (if desired) of the polymer chains, and a molecular weight which can readily be controlled to many desired values over a wide range. The preferred polymer molecular weight is between about 500 and about 10,000, more preferably between about 1,500 and about 5,000. These molecular weights are measured by gel permeation chromatography (GPC) using a polystyrene standard.

Note that the molecular weight of the polymers can be controlled by varying the stoichiometry of the diol and bischloromethyl monomers. Typically, the polymers are prepared using an excess of the diol monomer relative to the bischloromethyl monomer, thereby providing a hydroxy-terminated polymer. Alternately, the polymer may be terminated by chloride groups by the simple technique of adjusting the stoichiometric ratio of monomers such that the bischloromethyl (i.e. the bischloromethyl monomer) is present in excess relative to the diol monomer. As another alternative, other functional moieties can be used to end-cap the polymer molecules to impart a desired terminal functionality to the polymer. For example, the hydroxy-terminated polymer can be reacted with an excess of diisocyanate to yield an isocyanate-terminated polymer. Alternately, a diacid chloride such as adipoyl chloride, phosgene, or other similar compounds can be reacted with the hydroxy-terminated polymer to give polymers terminated with acid chloride or chloroformate groups. In similar ways, the chloride end groups of the chloride-terminated polymer can be chemically modified to yield any of a variety of functional groups as terminal groups for these polymers. This flexibility in designing the end group or terminal group on the polymer molecule is important because it allows a great range of possibilities in terms of the curing of these materials with other components to fabricate the desired final product, namely the propellant or explosive product.

The reaction time useful for the process of the present invention is not narrowly critical and can vary over a wide range. It is preferred that the reaction time be between about 2 and about 8 hours, more preferably between about 3 and about 5 hours.

Likewise, the reaction temperature is not narrowly critical and can vary over a wide range. Preferably the reaction temperature is between about 0° C. and about 120° C., more preferably between about 25° C. and about 95° C., and most preferably between about 45° C. and about 65° C.

The reaction in accordance with the present invention is preferably suitably conducted, for the most part, at subatmospheric pressure, most preferably at a pressure of between about 0.001 mm of Hg and about 600 mm of Hg. The subatmospheric pressure makes it possible for easy removal of the hydrogen chloride by-product from the reaction mixture, thereby driving the polycondensation reaction to completion as desired. Because of the volatility of some of the monomers employed, however, subatmospheric pressure is preferably not applied during the initial stage of the reaction. Alternative or additional methods can be used to remove by-product hydrogen chloride from the reaction mixture, such as bases which do not react with the bis-chloromethyl monomer.

The optional Polymer purification step, if utilized, is preferably conducted by precipitation in a mixture of a paired solvent/non-solvent. Suitable solvent/non-solvent pairs can be chosen from the following solvents: methylene chloride, chloroform, tetrahydrofuran, or any other organic solvent capable of dissolving the polymers; and the following non-solvents: methanol, ethanol, water, hexane, cyclohexane, benzene or any other organic medium which is not a solvent for polymers. Alternately, other purification methods can be employed such as gel permeation chromatography.

The polymers produced in accordance with the process of the present invention generally have a weight average molecular weight of between about 500 and about 10,000, preferably between about 1000 and about 5000. The glass transition temperature of the polymer ($T_g$) is generally less than 0° C., preferably less than −10° C., and more preferably less than −15° C. The viscosity of the polymer is generally less than 50,000 centipoise, preferably less than 20,000 centipoise, and more preferably less than 10,000 centipoise.

As used herein, the term "percent" designates weight percent and the term "fraction" designates mole fraction unless otherwise specified.

The aforementioned technical publications are incorporated herein by reference in their entirety.

The following examples are intended to illustrate, but in no way limit the scope of, the present invention.

EXAMPLE 1

Synthesis of Polymer 1 as Identified in Table I

A 10 ml one-neck flask was equipped with a magnetic stirring bar and a nitrogen adaptor. The flask was charged with 1.73 g (7 mmol) of 2,5-dinitraza-1,6-dichlorohexane and 0.90 g (8.5 mmol) of diethylene glycol. The mixture was heated to 55° C. and stirring started when the mixture melted. A vacuum of 20 mm Hg applied for 1.5 hrs and then a vacuum of 1 mm Hg for another 1.5 hrs. The viscous material cooled to room-temperature and dissolved in 5 ml of tetrahydrofuran (THF). The polymer was precipitated by pouring the THF solution into 30 ml of methanol. The polymer washed two times with 5 ml portion of methanol. It was dried in a vacuum oven at room temperature overnight. The yield was 1.83 g (93 percent) based on dichloromethyl starting material used. The molecular weight of this product is given in Table I. The glass transition temperature for this polymer (Polymer 1) was determined to be −18° C. An analogous procedure was followed, except that 1,3-propylene glycol was used instead of the diethylene glycol to yield Polymer 7 in Table I below.

EXAMPLE 2 (COMPARATIVE EXAMPLE)

Synthesis of Polymer 2 as Identified in Table I

Polymer 2 was synthesized by the same method as described for Polymer 1 by using 6.04 g (24.4 mmol) of 2,5-dinitraza-1,6-dichlorohexane and 1.85 g (29.7 mmol) of ethylene glycol. The yield was 4.5 g (66 percent) based on dichloro compound used. The molecular weight of the product is given in Table I. This preparation was somewhat analogous to the preparation given in Example I of U.S. Pat. No. 3,808,276, except that no glycerol was utilized in the present comparative example. The molecular weight of the product is 1970 (weight average), as given in Table I hereinbelow, and this molecular weight is below the desired molecular weight of at least 2,000 required by this invention.

EXAMPLE 3

Synthesis of Polymer 3 as Identified in Table I

Polymer 3 was synthesized by the same method as described for Polymer 1 using 4.98 g (14.87 mmol) of 2,5,8-trinitraza-1,9-dichlorononane and 2.06 g (19.41 mmol) of diethylene glycol. The yield was 3.66 g (67 percent) based on dichloro compound used. The molecular weight is given in Table I.

EXAMPLE 4

Synthesis of Polymer 4 as Identified in Table I

Polymer 4 was synthesized by the same method as described for Polymer 1 by using 4.30 g (14.0 mmol) of 2,4,6-trinitraza-1,7-dichloroheptane and 1.86 g (17.5 mmol) of diethylene glycol. The yield was 3.58 g (75 percent) based on dichloro compound used. The molecular weight is given in Table I.

EXAMPLE 5

Synthesis of Polymer 5 as Identified in Table I

Polymer 5 was synthesized by the same method as described for Polymer 1 by using 2.96 g (12 mmol) of 2,5-dinitraza-1,6-dichlorohexane, 1.72 g (5.14 mmol) of 2,5,8-trinitraza-1,9-dichlorononane and 2.19 g (20.65 mmol) of diethylene glycol. The yield was 4.80 g (91 percent) based on dichloro compound used. The molecular weight is given in Table I.

EXAMPLE 6

Synthesis of Polymer 6 as Identified in Table I

Polymer 6 was synthesized by the same method as described for Polymer 1 by using 1.23 g (5 mmol) of 2,5-dinitraza-1,6-dichlorohexane, 3.91 g (11.66 mmol) of 2,5,8-trinitraza-1,9-dichlorononane and 2.13 g (20.07 mmol) of diethylene glycol. The yield was 4.02 g (73 percent) based on dichloro compound used. The molecular weight of the product is given in Table I.

TABLE I

Identification of Weight Average ($M_w$) and Number Average ($M_n$) Molecular Weights for the Polymers by GPC*

| Polymer | $M_w$ | $M_n$ |
| --- | --- | --- |
| 1 | 2438 | 1688 |
| 2 (Comparison) | 1970 | 1372 |
| 3 | 1565 | 849 |
| 4 | 2833 | 1607 |
| 5 | 2172 | 1251 |
| 6 | 1715 | 1159 |
| 7 | 3565 | 1800 |

*Based on a polystyrene standard.

In Table I, the various number polymers are more specifically identified by the empirical structural formula as follows:

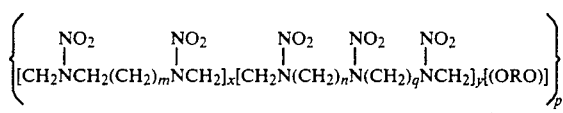

wherein p had a value of between 2 and 20, and wherein:

| Polymer | m | n | q | x | y | R |
| --- | --- | --- | --- | --- | --- | --- |
| 1 | 1 | N/A | N/A | 1 | 0 | —CH$_2$CH$_2$OCH$_2$CH$_2$— |
| 2 | 1 | N/A | N/A | 1 | 0 | —CH$_2$CH$_2$— |
| 3 | N/A | 2 | 2 | 0 | 1 | —CH$_2$CH$_2$OCH$_2$CH$_2$— |
| 4 | N/A | 1 | 1 | 0 | 1 | —CH$_2$CH$_2$OCH$_2$CH$_2$— |
| 5 | 1 | 2 | 2 | 0.7 | 0.3 | —CH$_2$CH$_2$OCH$_2$CH$_2$— |
| 6 | 1 | 2 | 2 | 0.3 | 0.7 | —CH$_2$CH$_2$OCH$_2$CH$_2$— | wherein N/A denotes "not applicable".

What is claimed is:

1. A process of producing a nitramine-containing polymer which comprises the step of reacting a reaction mixture consisting essentially of a nitramine-containing bischloromethyl monomer and a diol monomer by a solvent-free, melt polymerization reaction to form said nitramine-containing polymer while removing by-product hydrogen chloride during the course of said reaction, wherein by-product hydrogen chloride is removed during the course of said reaction by vacuum with the proviso that a vacuum is applied only after any volatile monomer reactants have reacted.

2. The process of claim 1 wherein said by-product hydrogen chloride is removed by bases.

3. The process of claim 1 wherein said nitramine-containing polymer is purified by precipitation using a paired solvent/non-solvent mixture.

4. The process of claim 3 wherein the solvent is selected from the group consisting of methylene chloride, chloroform, tetrahydrofuran, and mixtures thereof.

5. The process of claim 3 wherein the non-solvent is selected from the group consisting of water, methanol, ethanol, hexane, cyclohexane, benzene, and mixtures thereof.

6. The process of claim 1 which is conducted at a reaction temperature of between about 40° C. and about 70° C.

7. The process of claim 1 which is conducted at a reaction pressure of atmospheric or subatmospheric pressure.

* * * * *